Aug. 17, 1926.

F. B. SPROSS

SWING

Filed June 19, 1925

INVENTOR.
Frederick B. Spross
BY Frank Keiper,
ATTORNEYS.

Aug. 17, 1926.
F. B. SPROSS
SWING
Filed June 19, 1925
1,596,071
2 Sheets-Sheet 2
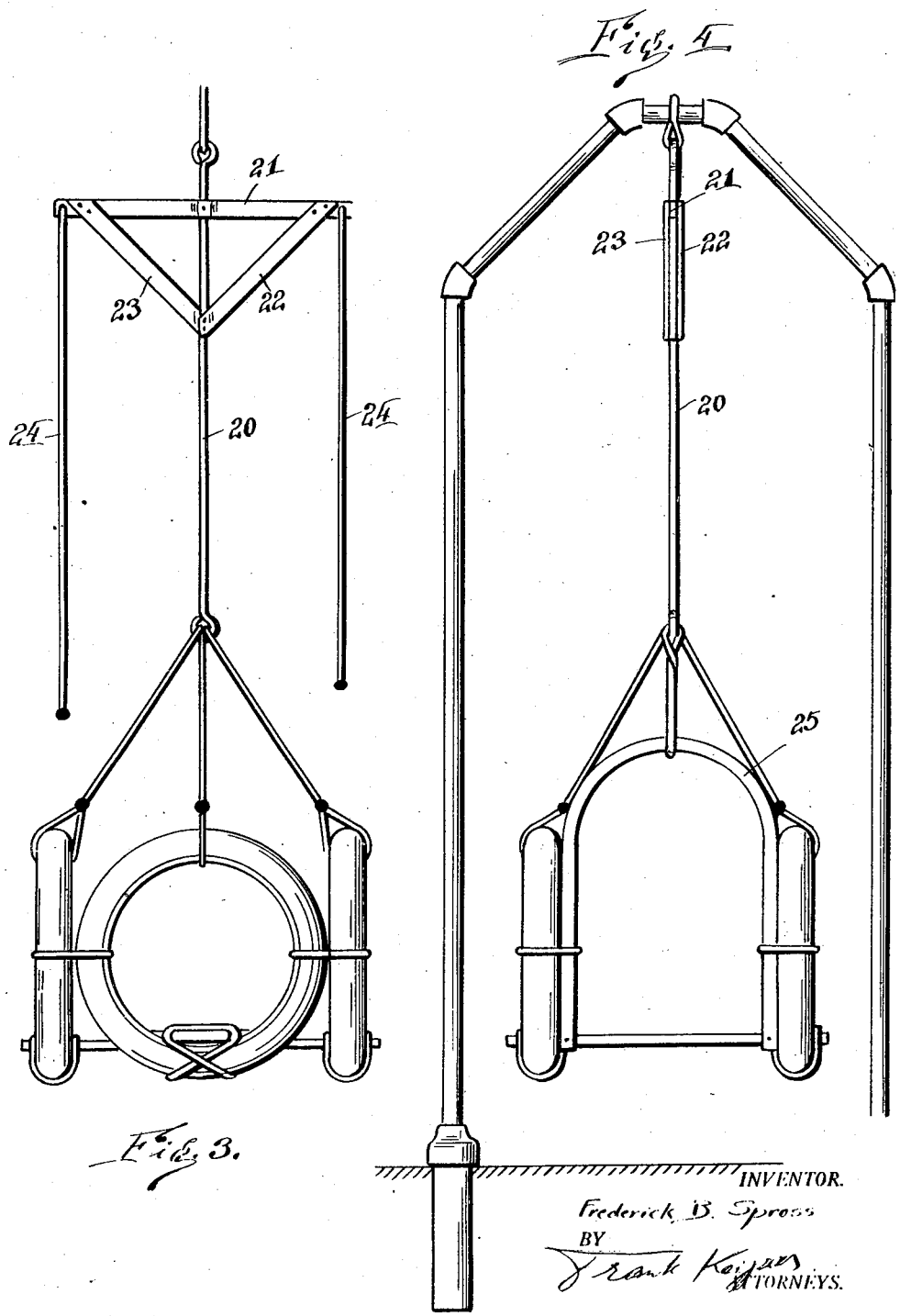

Patented Aug. 17, 1926.

1,596,071

UNITED STATES PATENT OFFICE.

FREDERICK B. SPROSS, OF BERGEN, NEW YORK.

SWING.

Application filed June 19, 1925. Serial No. 38,327.

The object of this invention is to provide a new and improved type of swing made up of discarded automobile tires.

This and other objects of the invention will be fully illustrated in the drawings, described in the specification and pointed out in the claims at the end thereof.

In the accompanying drawings:

Figure 3 is a side elevation of a modified form of the improved swing.

Figure 4 is a front elevation of a frame with another modified form of the swing suspended therein.

In the several figures of the drawing like reference numerals indicate like parts.

The swing forming the subject matter of my present invention is intended to be very inexpensive and simple in its construction as I utilize discarded auto tires for the supporting members of the swing.

Figure 1:
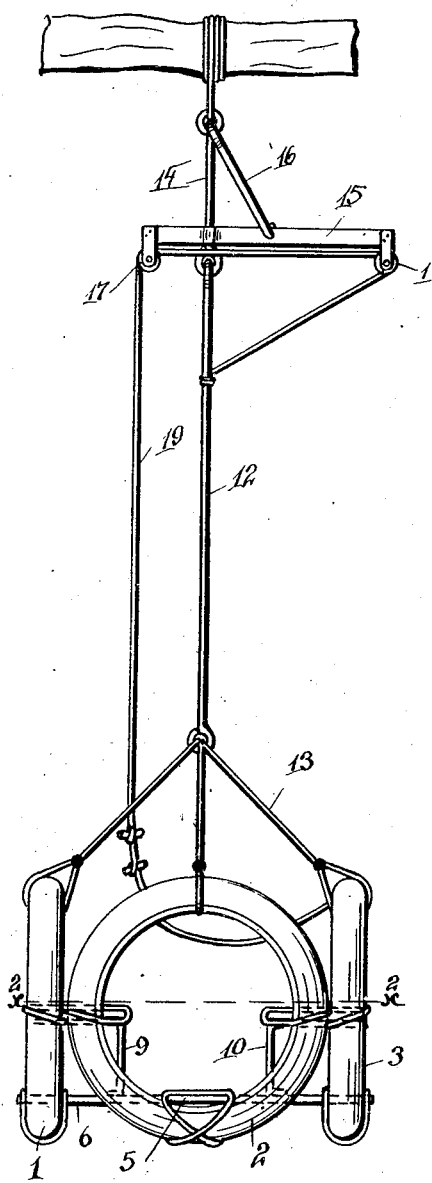
Figure 1 is a side elevation of the improved swing.
Figure 2:
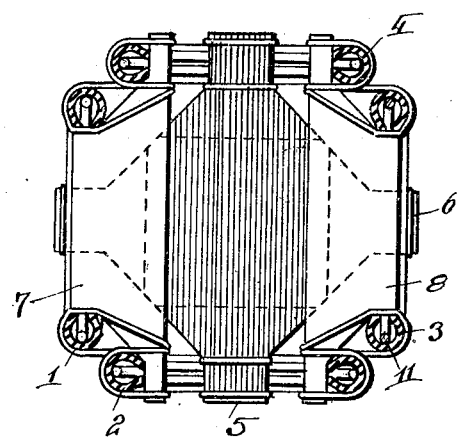
Figure 2 is a horizontal sectional view of the swing the section being taken on the line 2ˣ, 2ˣ of Fig. 1.

As illustrated in the figures four of these tires are used for each swing and are placed with relation to each other so that they form a rectangular support. The four tires 1, 2, 3 and 4 illustrated in Figures 1 and 2 are tied together at the bottom by the cross boards 5 and 6, the cross board 5 being supported and tied to the tires 2 and 4 and the cross board 6 being supported and tied to the tires 1 and 3. The boards may be tied to the tires in any suitable manner by means of a rope, cable or wire which are looped around the boards at their ends so that they cannot shift within the tire in which they are supported. The two cross boards 5 and 6 may be of any suitable outline and form the platform for the swing as illustrated in plan view in Fig. 2.

Two seats are provided in the swing and are formed by the seat boards 7 and 8. These seat boards are tied to the middle of the tires and backs of them are cut away so as to fit diametrically into the tires 1 and 3. The ends of the seat board are cut away so that a portion thereof projects into the tires 2 and 4. This allows each seat board to be tied to three of the tires namely one at each end of the seat board and the third at the back of the seat board. Suitable rope, cable or wire is used to tie the seat boards to these tires.

If desired braces 9 and 10 may be interposed between the underside of the seat boards 7 and 8 and the top of the platform formed by the cross boards 5 and 6 in order to make the seats more rigid in their construction.

Tires such as are used on the larger and heavier types of automobile are rigid and are not distorted when a heavy weight is suspended from them, but this is not true of tires of the lighter types of cars and when using the tires of these lighter cars it may be desirable to reinforce them by means of hoops 11 that are inserted within the tires as illustrated in Figure 2 in order to increase the stiffness and prevent their distortion when suspending the swing thereon.

The swing is suspended from a rod or cable 12 and each of the tires 1, 2, 3 and 4 is connected to the lower end of this rod or cable by means of a short rope or cable 13. The rope or cable 12 in turn is suspended from a rod 14 on which it can swing. On the rod 14 is also supported the cross bar 15 which is held in a horizontal position on the rod 14 by the link 16. Both the rod 14 and link 16 are suitably joined together at the top and are then fastened to a common support such as a limb of a tree or a frame work for the swing.

The horizontal cross bar 15 has the pulleys 17 and 18 pivoted at the outer ends thereof. A rope or cable 19 passes over these pulleys and one end thereof is tied to the suspending rod or cable 12 at a point intermediate of the upper and lower ends of the rod. The other end of the cable may hang free from the cross bar or be fastened to one of the tires as illustrated in Figure 1. The rope or cable 19 is used for propelling the swing, that is, the person sitting in the swing can take hold of the rope or cable 19 and pull on it. This will start the swing in motion as any pull on the rope will be transmitted over the pulleys 17 and 18, that is, from one end of the cross bar to the other, and then to a point on the cable or rod 12 pulling this rod or cable and with it the swing to one side. Repeated pulls on the rope or cable 19 at suitable intervals will thus keep the swing in motion.

In Figure 3 the swing is shown without the seat boards so that only a platform is provided thereon. In this form of the swing the tires are preferably tied together in the middle so as to properly space them apart. The suspending member of the swing illustrated in this figure is made up of a rod 20 having the horizontal cross bar 21 fastened thereto near the upper end thereof. This cross bar has its outer ends braced by the angular braces 22 and 23. A cable or rope 24 is attached to the outer ends of the cross bar 21 and hangs down from these ends so that it can be taken hold of by the person in the swing and pulled thereon. This will cause the swing to be swung forwardly at each pull.

In Figure 4 I have shown a suitable frame built up of piping in which the swing may be suspended. It is, of course, not necessary to use such a frame as the swing can be suspended in any suitable manner and in any place where there is enough room for the swing to freely swing.

The swing mounted in the frame illustrated in Figure 4 is slightly modified from that illustrated in Figure 3 in that two of the tires are replaced by the yokes 25. These yokes serve the same purpose as the tires which they replace but provide larger openings than the tires through which the swing can be entered.

I claim:

1. In a swing, the combination of a series of automobile tires arranged in a rectangle, a platform supported by said tires, seats supported by said tires above said platform and means for suspending said swing.

2. In a swing, the combination of two pairs of automobile tires the tires of each pair being arranged parallel to each other, a platform supported by said pairs of automobile tires, seats mounted within one pair of said automobile tires, and means for suspending said swing.

In testimony whereof I affix my signature.

FREDERICK B. SPROSS.